United States Patent [19]
Ujiie

[11] Patent Number: 5,946,310
[45] Date of Patent: Aug. 31, 1999

[54] ASYNCHRONOUS TRANSFER MODE SWITCH

[75] Inventor: Hiroyuki Ujiie, Kawasaki, Japan

[73] Assignee: Fujitsu Limited, Kanagawa, Japan

[21] Appl. No.: 08/723,031

[22] Filed: Sep. 30, 1996

[30] Foreign Application Priority Data

Dec. 13, 1995 [JP] Japan ..................................... 7-324120

[51] Int. Cl.$^6$ .............................. H04L 12/28; H04L 12/56
[52] U.S. Cl. ............................................ 370/395; 370/414
[58] Field of Search ..................................... 370/395, 396, 370/389, 400, 410, 360, 382, 244, 248, 250, 907, 414; 340/825.02

[56] References Cited

U.S. PATENT DOCUMENTS

| | | | |
|---|---|---|---|
| 5,619,500 | 4/1997 | Hiekali | 370/414 |
| 5,663,959 | 9/1997 | Nakagawa | 370/395 |
| 5,781,320 | 7/1998 | Byers | 370/907 |

*Primary Examiner*—Hassan Kizou
*Assistant Examiner*—Afsar M. Qureshi
*Attorney, Agent, or Firm*—Helfgott & Karas, P.C.

[57] ABSTRACT

A processor bus PBS connecting each LSI and a micro processor has been removed in an asynchronous transfer mode ATM switch in order to reduce number of contact terminals for LSIs, which are employed to constitute the asynchronous transfer mode ATM switch. The ATM switch may comprise a plurality of LSIs connected in cascade, each for processing asynchronous transfer mode cells for a predetermined stage; a processor for outputting control information addressed to the plurality of the LSIs, and receiving control cells sent from the plurality of the LSIs; a converting circuit operatively connected to the processor for making the control cells outputted from the processor into cells to output to the plurality of LSIs, receiving the control cells sent from the plurality of LSIs, and converting the control cells into control information including an address and data to input to the processor; a control cell inserting circuit operatively connected to a first LSI of the plurality of the LSIs for inserting the control cells sent from the converting circuit to the asynchronous transfer mode cells, and inputting the control cells to the first LSI; and a control cell extracting circuit operatively connected to a last LSI of the plurality of the LSIs for extracting the control cells sent through the plurality of the LSIs.

12 Claims, 12 Drawing Sheets

ASYNCHRONOUS TRANSFER MODE SWITCH

BACKGROUND OF THE INVENTION

1. Field of the Invention

The present invention relates to an asynchronous transfer mode (ATM) switch. More particularly, it relates to an ATM switch, which may be constituted by LSIs, each having a small number of contacting terminals, so that a compact ATM switch can be obtained.

2. Description of the Related Art

Transmission path interface circuits or subscriber line interface circuits in an ATM switch perform various kinds of processing for passing cells. The switch, which performs such various kinds of processing, is generally constituted with a plurality of large sized LSIs.

FIG. 12 shows a concept of a structure for a device, which performs cell processing. A plurality of large sized LSI-1 to LSI-n, each of which performs a corresponding processing on each of a plurality of processing steps, are provided in a cascade form on a cell highway (cell HW), on which usual cells are passed.

An interface circuit, not shown in the diagram, converts the usual cells on the cell HW to parallel signals in order to decrease the speed of cell transmission. The converted cells pass through each of the LSI-1 to LSI-n, and are subjected to the corresponding processing therein.

The plurality of LSI-1 to LSI-n are connected to and controlled by a micro processor 10 via a processor bus PBS. For example, a case where a transmission speed of the usual cells is 10 Mbps, address signals are transmitted in parallel with 16 bits, and data are transmitted in parallel with 32 bits, will be now considered. A processor bus PBS, which is constituted with several ten control lines, connects each of the plurality of LSI-1 to LSI-n to the micro processor 10.

Further, each of the plurality of LSI-1 to LSI-n is connected to the cell HW. If the switch is made more compact, the number of contact terminals for LSIs should be problem, as high integration of LSIs is more progressed. Since number of contact terminals for an LSI or a space for providing the contact terminals on a chip of the LSI is limited, there is a limitation in making the switch compact.

The number of contact terminals becomes larger, the more the appearance of the LSI becomes larger, thus it becomes difficult to make the switch compact.

Taking a LSI having a size of 5 by 5 square centimeters as an example, it is required to provide 304 pieces of contact pins including electrical source lines on four sides of the LSI. In this case, the pitch width between pins becomes 0.3 to 0.5 mm.

Therefore, it becomes important to reduce the number of contact terminals when designing a switch device with the use of LSIs having high density. The number of contact terminals of LSIs for use in an ATM switch, becomes large, because of input and output terminals for the converted parallel cells on the cell HW and the processor bus PBS. That causes a problem on making the switch compact.

SUMMARY OF THE INVENTION

Accordingly, it is an object of the present invention to provide an ATM switch, which may be constituted by LSIs, for processing cells on the cell HW, each having a small number of contacting terminals, so that a compact ATM switch can be obtained.

It is another object of the present invention to provide an ATM switch, which removes a processor bus PBS for connecting each of LSIs and a micro processor, which controls the LSIs for processing each cell, to reduce the number of required terminals for the processor bus PBS.

It is a further object of the present invention to provide an ATM switch, which can employ cells on the cell HW for transmitting control signals from a microprocessor, by making control information, which has conventionally been transmitted through the processor, into cells with the use of the cells on the cell HW, and connect the micro processor to the LSIs.

An asynchronous transfer mode switch according to the present invention to realize the above-described objects may have a basic structure as follows;

The asynchronous transfer mode switch includes a plurality of LSIs connected in cascade, each for processing asynchronous transfer mode cells for a predetermined stage; a processor for outputting control information addressed to the plurality of the LSIs, and receiving control cells sent from the plurality of the LSIs; a converting circuit operatively connected to the processor for making the control cells outputted from the processor into cells to output to the plurality of LSIs, receiving the control cells sent from the plurality of LSIs, and converting the control cells into control information including an address and data to input to the processor; a control cell inserting circuit operatively connected to a first LSI of the plurality of the LSIs for inserting the control cells sent from the converting circuit to the asynchronous transfer mode cells, and inputting the control cells to the first LSI; and a control cell extracting circuit operatively connected to a last LSI of the plurality of the LSIs for extracting the control cells sent through the plurality of the LSIs.

As described above, the present invention can remove a direct connection, that is a processor bus, between the micro processor 10 and each of the LSIs by loading control cells on the usual cells. Accordingly, it is possible to make LSIs have high density, thus making the device compact.

DESCRIPTION OF THE PREFERRED EMBODIMENTS

Figure 1:
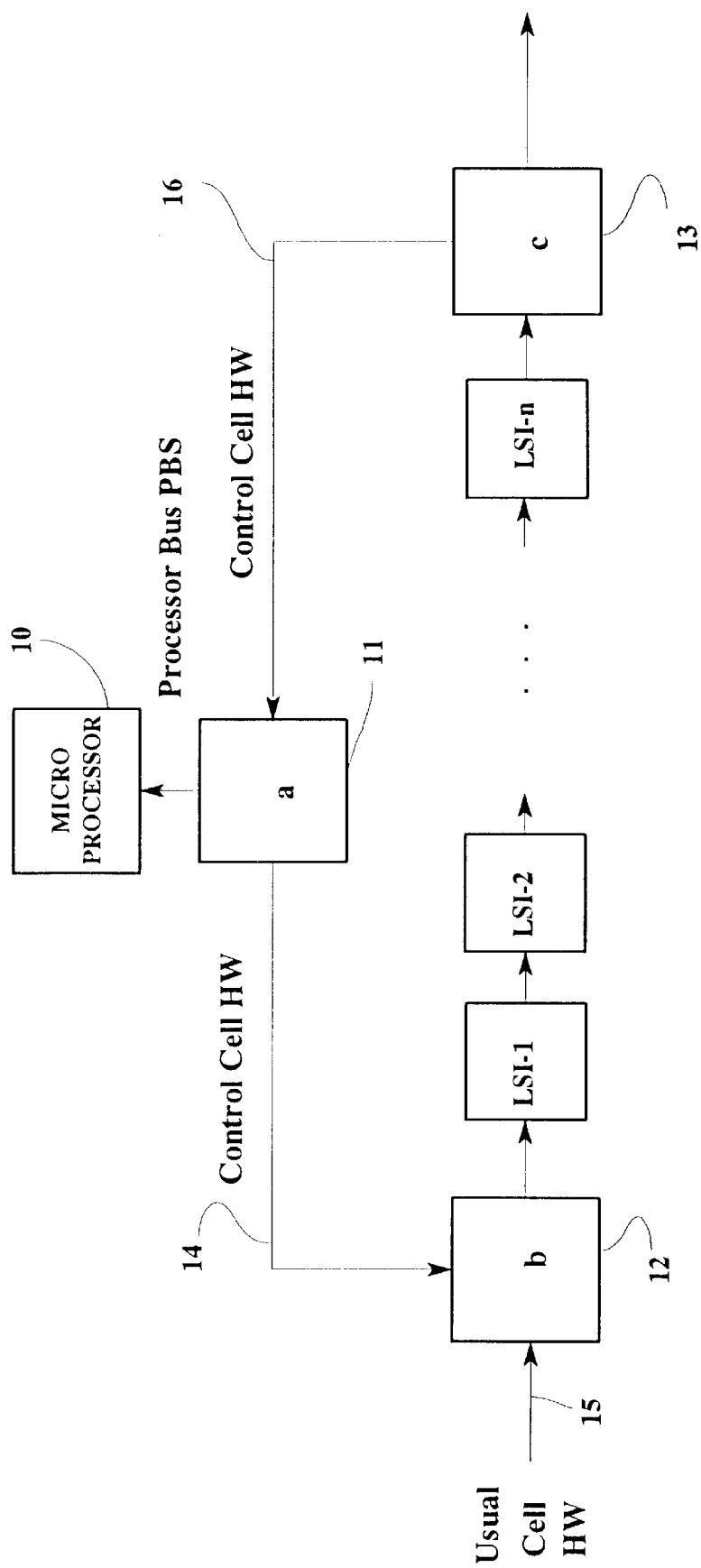
FIG. 1 is a block diagram illustrating a first embodiment according to the present invention.

Embodiments according to the present invention will be explained in accompanying with drawings. Throughout the following descriptions, the same reference numerals or symbols are used to denote and designate corresponding or identical components.

FIG. 1 shows a principle diagram of a first embodiment according to the present invention. LSI-1 to LSI-n are connected to a cell HW in a cascade. ATM cells pass through each LSI subsequently to be subject to corresponding processing.

Further, an asynchronous transfer mode switch according to the present invention is constituted with a processor bus to control cell HW convertor 11, which is connected to a micro processor 10 via a processor bus PBS, a control cell inserting section 12, and a control cell extracting section 13. The control cell inserting section 12 and the control cell extracting section 13 are provided on the input and output sides of LSI-1 and LSI-n, respectively.

The micro processor 10 outputs control information, which is transferred via the processor bus PBS to the processor bus to control cell HW convertor 11. The processor bus to control cell HW convertor 11 converts the control information, which is formed as a bus, into a control cell, which is formed as a cell.

As explained later, the control cell has a header section which includes information indicating that the cell is a control cell, and therefore, is distinguished from a usual ATM cell. Further, the control cell high way (control cell HW) 14 sends the control cell to the control cell inserting section 12. The control cell inserting section 12 inserts the control cell into an empty timing portion of the usual cell. The control cell inserted to the usual cell on the cell HW 15 passes through each of the connected LSI-1 to LSI-n.

Each of the LSI-1 to LSI-n monitors passed cells. When an LSI of the LSI-1 to LSI-n recognizes the control cell directed to the own LSI, the LSI receives the information and performs processing corresponding to the contents of the control cell. Each of the control cells includes a label, by which the controlled LSI can detected as a control cell.

On contrary to this, transmission of control information from each LSI to the micro processor is performed by inserting the control information, which is formed into a cell in the LSI, to a cell HW 15 as a control cell. The control cell extracting section 13 extracts the control cell inserted by each LSI, and loads the extracted control cell on the control cell HW 16.

Further, the processor bus to control cell HW convertor 11 expands the extracted control cell into a bus-form to send to the micro processor 10 with the use of the processor bus PBS.

Although the conventional switch has a structure, in which the processor bus PBS is connected to each of the LSI-1 to LSI-n, it becomes useless to connect in such a way with the above-described structure according to the present invention. Accordingly, it will bring effectiveness to reduce the number of contact terminals of LSIs, such as making the LSIs compact, and in result, an ATM device using the LSIs itself compact.

Figure 2:
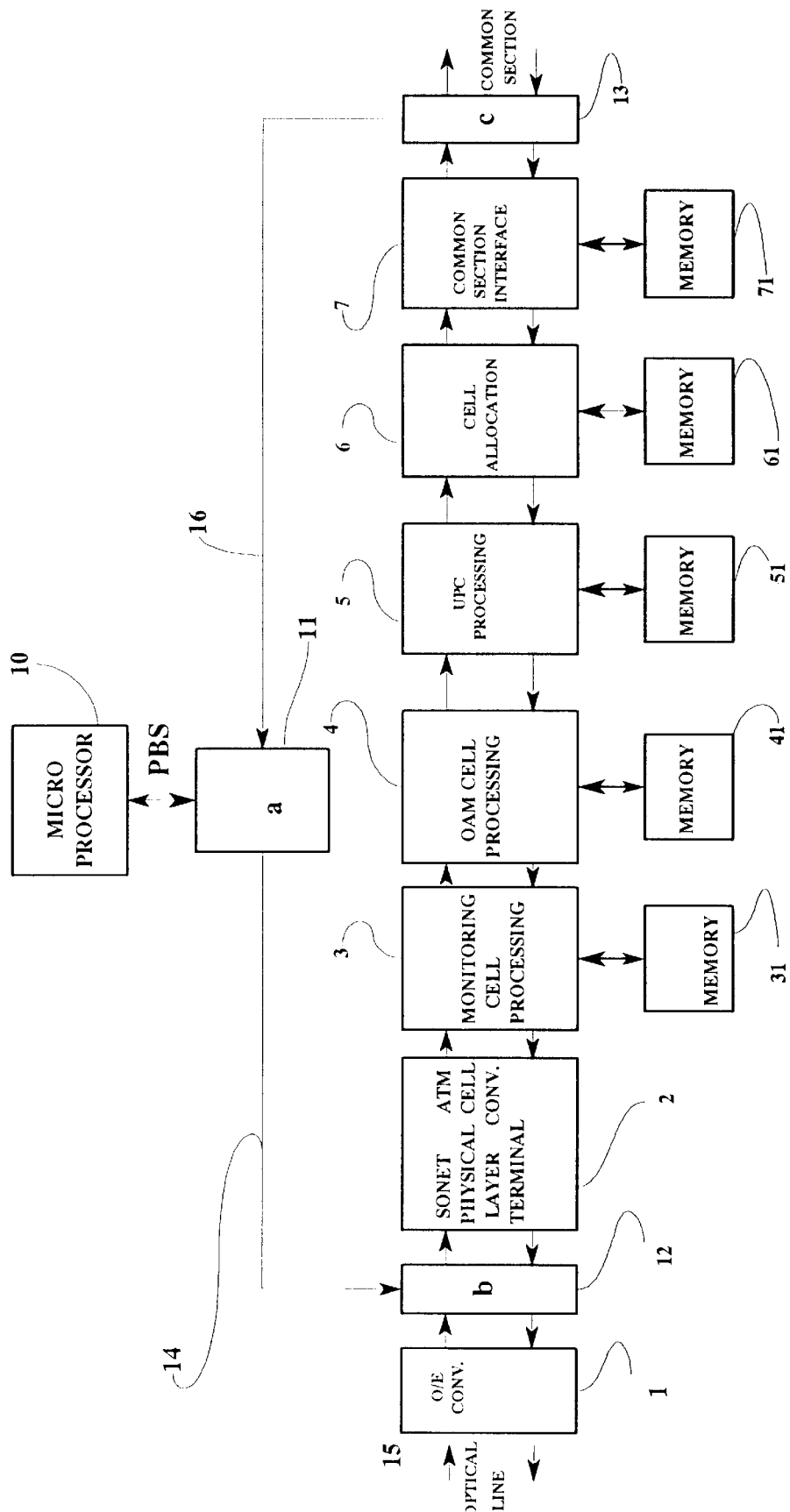
FIG. 2 is a diagram showing an example applying the present invention to an individual section of an ATM switch.

FIG. 2 shows a structural example applying the above-described present invention to an individual section of an ATM switch. The ATM switch is generally constituted with the individual section, a common section and a switch module. The individual section of the ATM switch is connected to subscriber lines toward a descending line (left direction), and to the common section of the ATM switch toward an ascending line (right direction). Further, the switch module is connected to the common section.

In FIG. 2, an optical transmission line is employed as a cell HW 15, on which a usual ATM cell is loaded. The usual ATM cell is here named as usual to be compared with a control cell according to the present invention.

In FIG. 2, the individual section of the ATM switch includes first to seventh LSIs 1 to 7 as an LSI block. The LSI-1 is an optical to electrical convertor connected to the optical line, which has a function of converting a 155.52 Mbps of an optical signal to an electrical signal and extracts a clock flame from the received optical signal.

The LSI-2 has functions of extracting ATM cells, collecting data on the physical layer, and converting the ATM cells to octet data, as an end-terminal of SONET (Optical synchronous transmission network). The LSI-3 has a function of processing execution management cells.

Further, the LSI-4 has functions of processing alarm cells and processing loop back cells. Then, the LSI-5 has functions of detecting and discarding cell band width error cells. The LSI-6 includes a function of counting passed or discarded cells for billing procedure.

The LSI-7 is a common section interface having functions of interfacing with the common section of the ATM switch, counting cells and looping back cells.

In FIG. 2, work memories 31, 41, 51, 61 and 71 are provided as corresponding to the LSI-3 to LSI-7, respectively. The control cell inserting section 12 is provided between the LSI-1, which has a function of converting an optical cell to an electrical cell and the LSI-2. The control cell inserting section 12 then inserts control cells sent from the micro processor 10 into the ATM cells, which are converted from the corresponding by the LSI-1 optical cells.

Meanwhile, a control cell extracting section 13 is connected to the common section side of the LSI-7 having a function of interfacing with the common section of the ATM switch.

Figure 3:
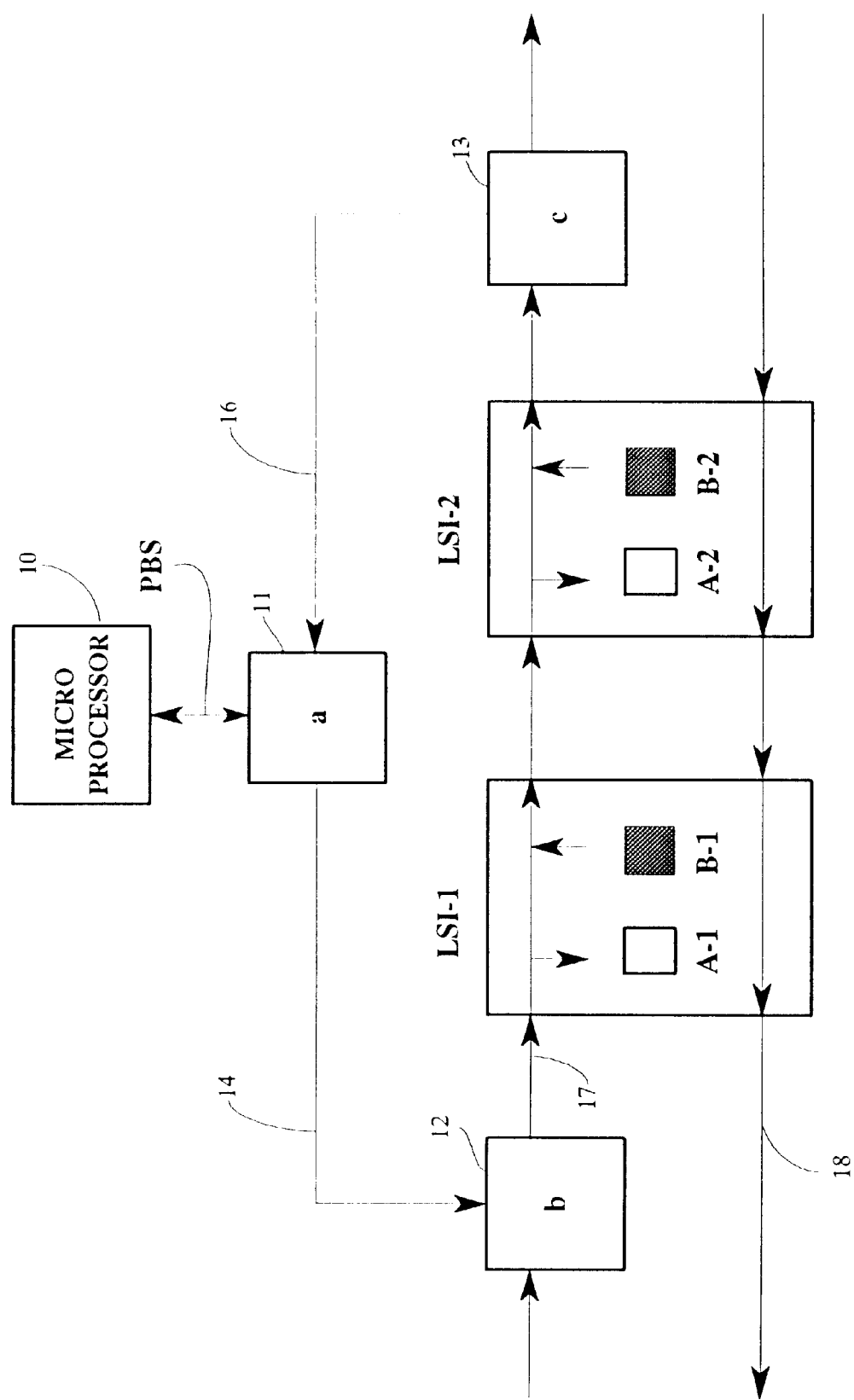
FIG. 3 is a block diagram illustrating a second embodiment according to the present invention.
Figure 4:
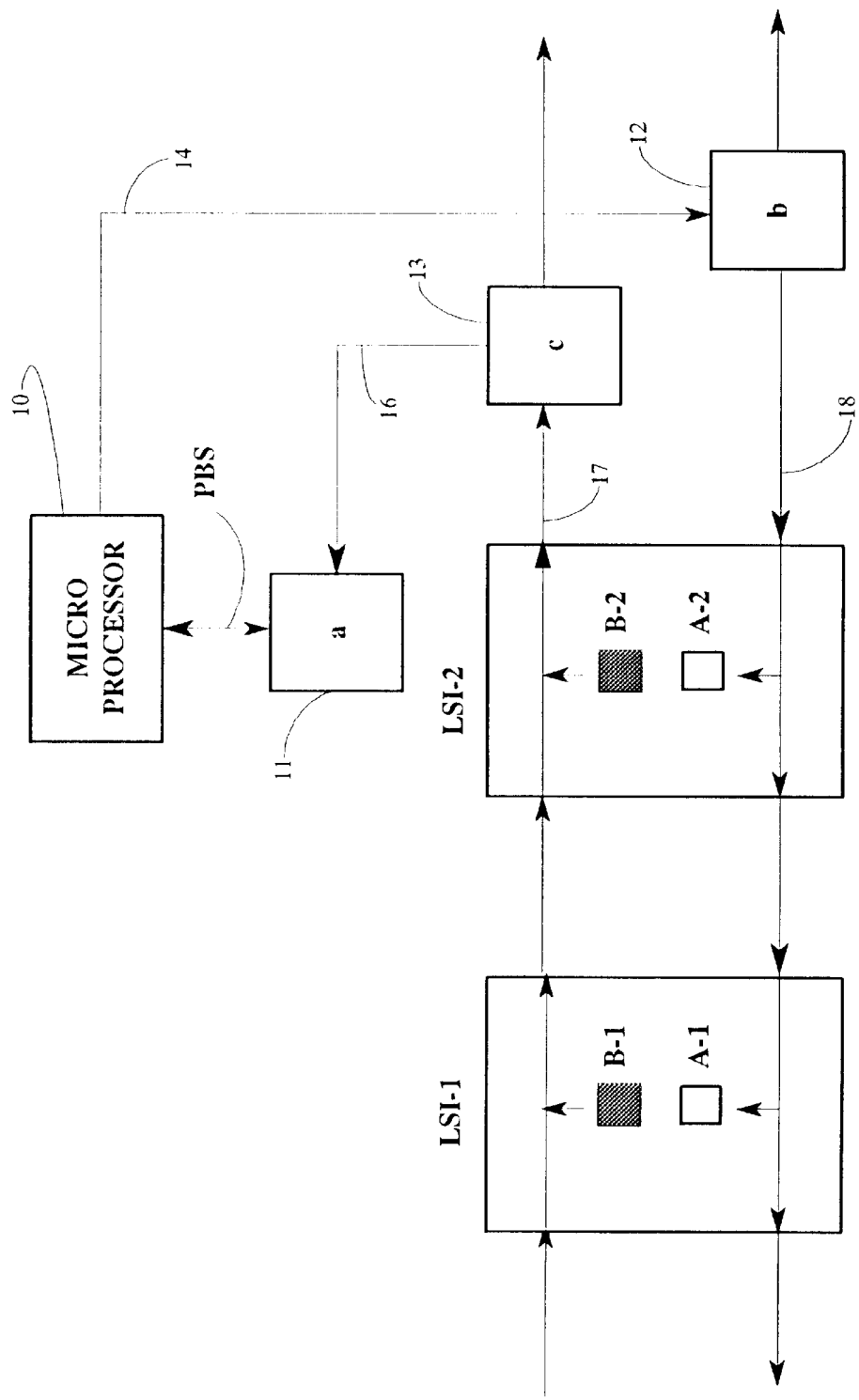
FIG. 4 is a block diagram illustrating a third embodiment according to the present invention.

FIGS. 3 and 4 show modified examples of the present invention. For simplicity, only LSI-1 and LSI-2 are shown in the diagrams. In the example of FIG. 3, the usual cell passes through the both of an ascending line (right direction) 17 and a descending line (left direction) 18.

On the other hand, in the example of FIG. 3, the control cell inserting section 12 and the control cell extracting section 13 are provided on only the ascending line (right direction) 17. Accordingly, the control cell passes through only the ascending line (right direction) 17.

Further, the processor bus to control cell HW convertor 11 makes control information sent from the micro processor 10 into cells to insert into the usual cell HW 17 of the ascending line with the use of the control cell inserting section 12. In the diagram, A-1 and A-2 mean control cells, which are directed to the LSI-1 and LSI-2, respectively.

The control cells A-1 and A-2 respectively inputted to the LSI-1 and the LSI-2 are recognized therein, and then the LSI-1 and the LSI-2 extract the control cells to develop as control information.

On the contrary, control information directed from the LSI-1 and LSI-2 to the processor 10 is formed into the control cells as shown with B-1 and B-2 in the diagram. Each of the control cells is inserted to the usual cell HW in the corresponding LSI. Then, the control cells are transferred to the control cell extracting section 13 through the ascending line 17.

The control cell extracting section 13 detects and extracts the control cells B-1 and B-2 from the ascending line 17, which is a usual cell highway HW, and sends out the extracted control cells to the control cell HW 16. The control cell HW 16 transfers the control cells B-1 and B-2 to the processor bus to control cell HW convertor 11, and then the processor bus to control cell HW convertor 11 develops the control cells B-1 and B-2 into a processor bus-form to interfaces with the micro processor 10.

In the case of FIG. 3, the control cells as well as the usual cell flow to the usual cell HW, which is an ascending line. The usual cell HW is then further required to have a additional transmission band width for the control cells in addition to the usual maximum transmission band width. That is, it becomes necessary for the usual cell HW to have more high speed than that of a conventional cell HW.

FIG. 4 shows another embodiment according to the present invention. The control cells A-1 and A-2 directed from the processor 10 to LSI-1 and LSI-2 are loaded on the usual cell HW 18 of the descending line, and the control cells B-1 and B-2 directed from the LSI-1 to the LSI-2 to the processor 10 are loaded on the usual cell HW 17 of the ascending line.

According to the embodiment of the present invention, as the control cells are piled on the ascending and descending lines, respectively, it becomes necessary to increase both the transmission widths of the ascending and descending lines. However, on comparison with the example of FIG. 3, as the control cells are dispersed to two lines, the band width may be increased only half of that shown in the example of FIG. 3, which shows only one directional line.

Further, the control cell inserting section 12 and the control cell extracting section 13 can be positioned in the neighborhood. Additionally, it also becomes easy to set the system. That means, it becomes possible to unitedly constitute a switch at need, that may make the switch compact.

Figure 5:
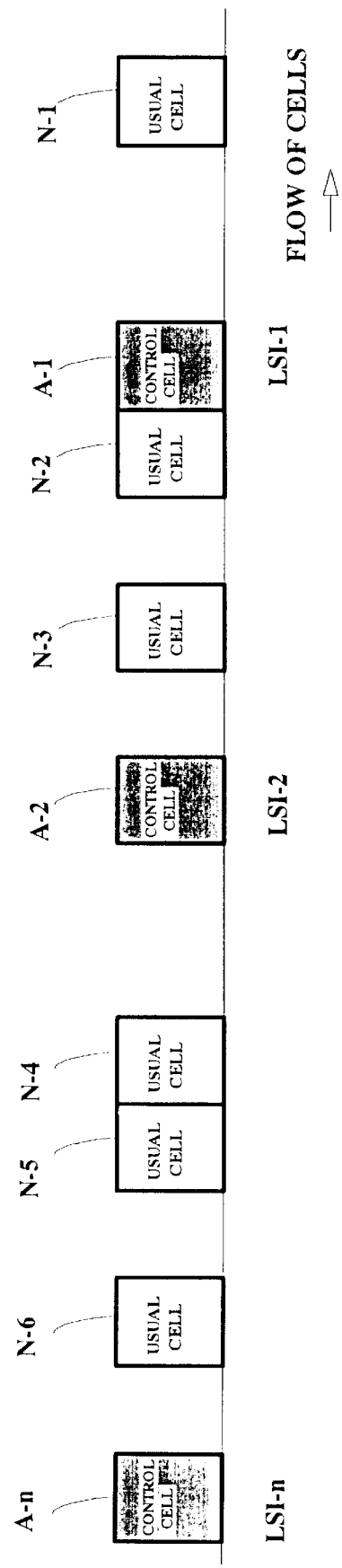
FIG. 5 is a diagram illustrating a first structural example of a cell HW.

FIG. 5 shows a first structural example of the cell HW 15 according to the present invention. Usual cells (N-1 to N-6) flow through the cell HW 15. Then, control cells (A-1 to A-n) are inserted into the usual cells (N-1 to N-6).

The control cells per LSI-1 to LSI-n are inserted into empty areas of the usual cells. In the example of FIG. 5, the control cells A-1 to A-n are randomly inserted to empty areas of the usual cells N-1 to N-6.

Figure 6:
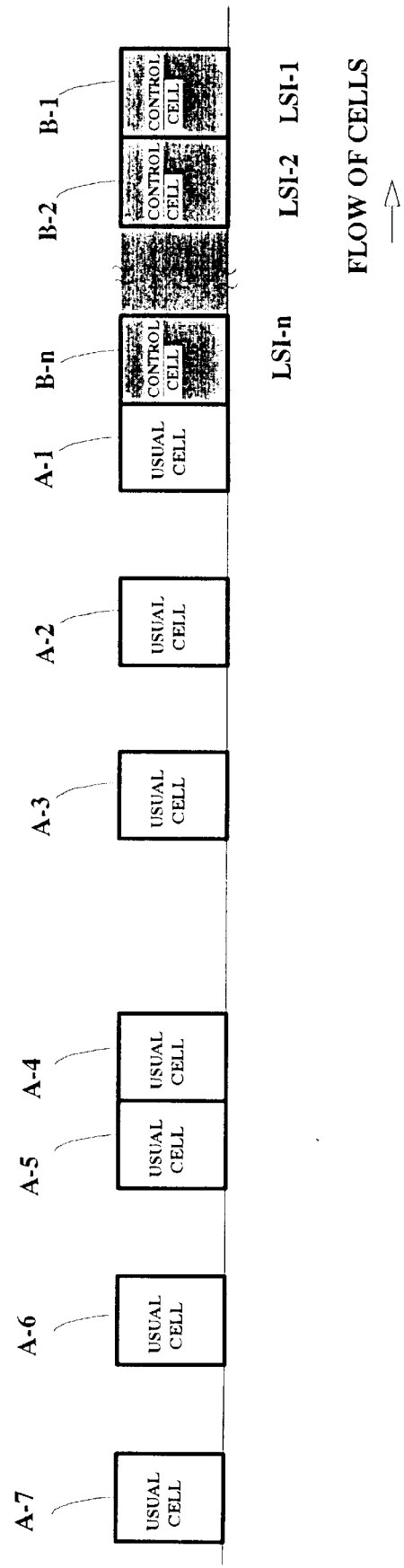
FIG. 6 is a diagram illustrating a second structural example of a cell HW.

FIG. 6 shows another structure of positioning control cells on cell HW 15. With this structure, predetermined timing slots are prepared in a flow of the cells in advance to insert control cells per each LSI.

The inserting positions or timing slots of control cells for LSI-1 to LSI-n are predetermined, and then, cell slots are kept regardless of existence of the control cells. That means band width on a flow of cells is increased due to load the control cells A-1 to A-n.

In this way, as insertion and extraction of control cells are performed on the fixed portion of cell slots, it becomes no need to monitor empty cells on the flow of cells.

Figure 7:
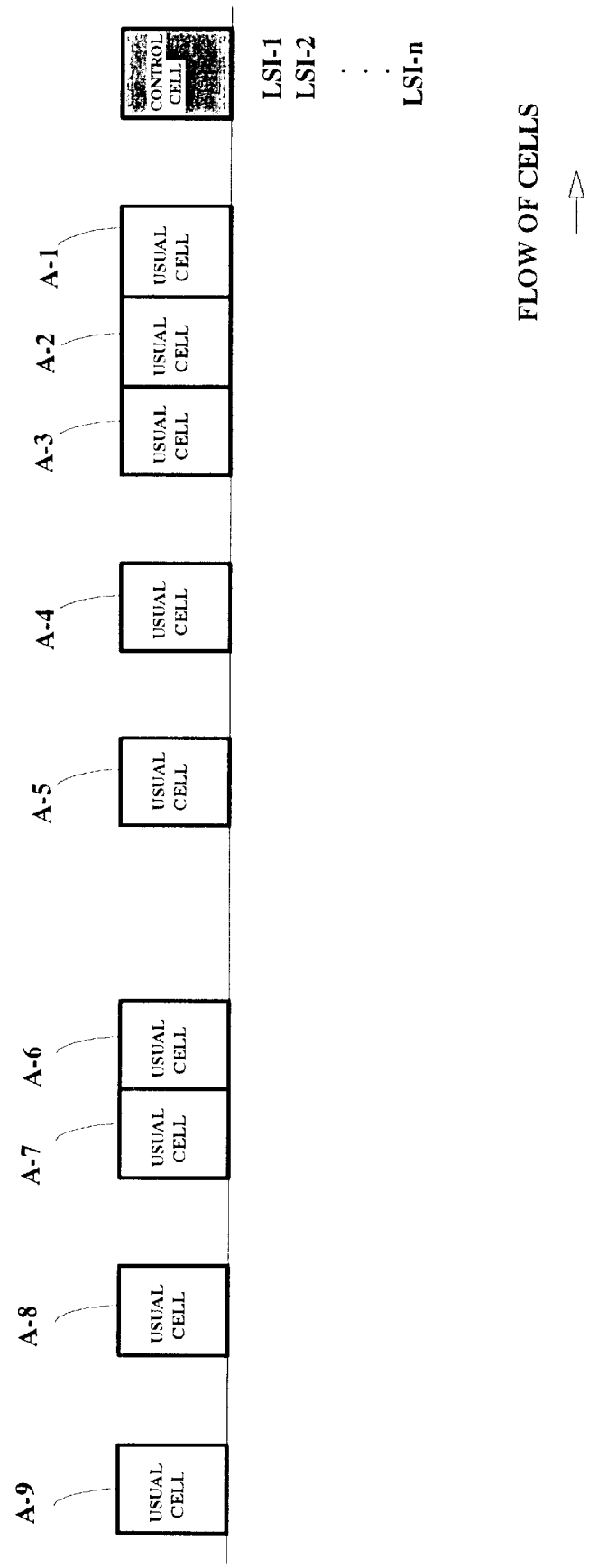
FIG. 7 is a diagram illustrating a third structural example of a cell HW.

FIG. 7 shows other structure of positioning control cells on the cell HW 15 according to the present invention. With this structure, each of LSI-1 to LSI-n does not have a corresponding control cell, individually, but all of control information for the LSIs are loaded on only one control cell.

Figure 8:
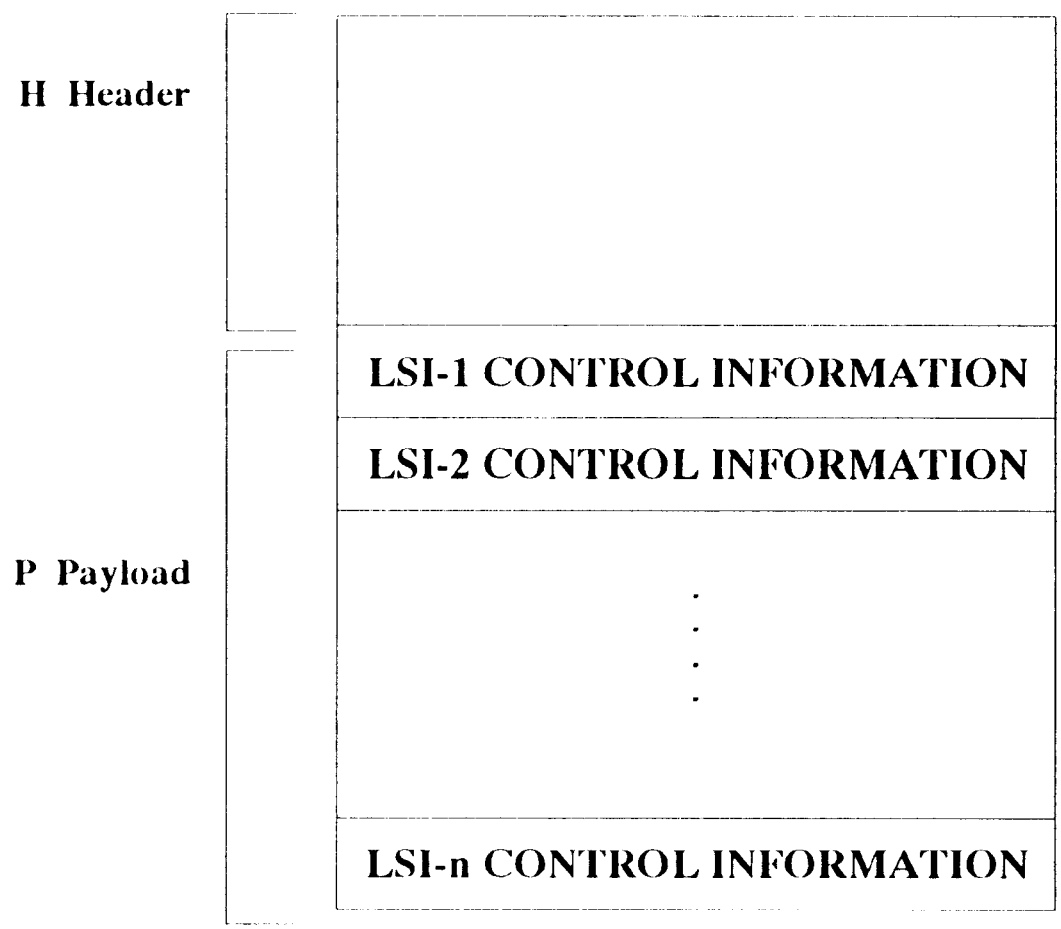
FIG. 8 is a diagram illustrating a structural example of a control cell.

FIG. 8 shows a structural example of a control cell, which is employed in the structure of positioning control cells on the cell HW 15 as shown in FIG. 7 according to the present invention.

As shown in FIG. 8, a payload section P of a control cell is separated to areas of control information respectively for LSI-1 to LSI-n to store the required information. With the use of this structure, it becomes possible to require less increment of band width caused by piling control cells.

With this structure, it is also possible that each LSI always takes control cells regardless of existence of own control information, or takes only a control cell, of which corresponding address information is provided in a header section H as described above.

Each of structural examples of the processor bus to control cell HW convertor 11, the control cell inserting section 12 and the control cell extracting section 13, which are commonly employed in the above-described embodiments, will now be explained.

Figure 9:
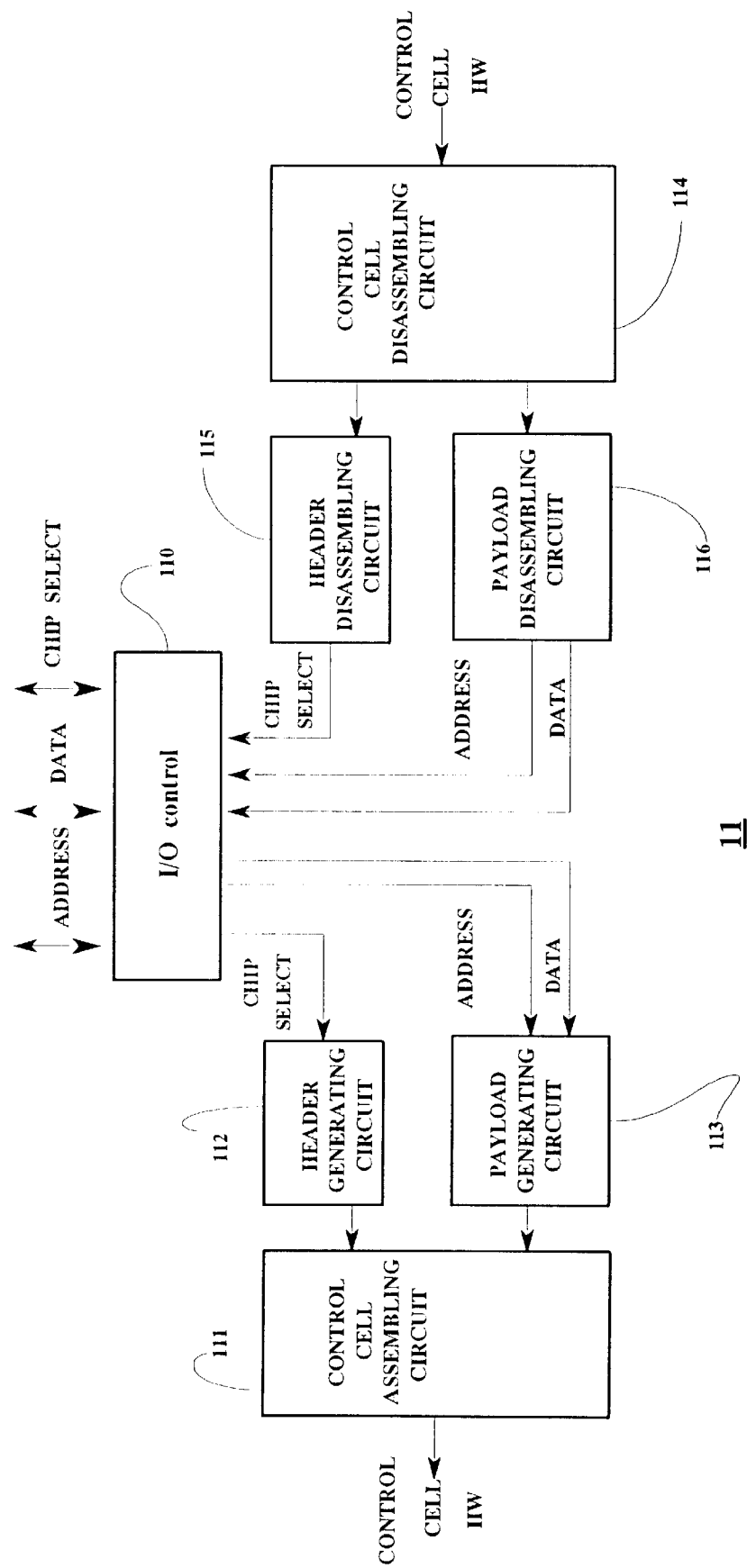
FIG. 9 is a block diagram illustrating a structural example of a processor bus to control cell HW convertor.

FIG. 9 shows a structural example of the processor bus to control cell HW convertor 11. In FIG. 9, an I/O controller 110 sends and receives an address AD, data DT and a chip select CS through a processor bus PBS to and from the micro processor 10.

The chip select CS sent from the micro processor 10 is inputted to a header generator 112 to position on a header section. It therefore, becomes possible to receive control cells in the LSI, which is addressed as one to receive the control cells by the chip select positioned on the header section, and distinguish between control cells and usual cells.

Meanwhile, addresses and data sent from the micro processor 10 are inputted to a payload generator 113 and positioned on the payload section.

A control cell assembling circuit 111 assembles header and payload sections sent from the header generator 112 and the payload generator 113 to form a control cell. In this embodiment, data is control information, and an address is to designate the LSI, which is addressed to receive the control information.

The control cells outputted from the control cell assembling circuit 111 are inserted into usual cells as described on the explanation of the control cell inserting section 12, as described above, and sent to the addressed LSI on the cell HW 15.

Meanwhile, the control cell extracting section 13 extracts the control cells directed to the micro processor 10 sent from the LSI-1 to LSI-n to input the extracted control cells to the processor bus to control cell HW convertor 11 through the control cell HW 16. The inputted control cells are inputted to the control cell disassembling section 114 in FIG. 9.

The control cell disassembling section 114 disassembles the inputted control cells, and inputs each of header and payload sections to a header disassembling section 115 and a payload disassembling section 116. The header disassembling section 115 extracts a chip select and sends it to the micro processor 10 through the I/O controller 110.

Simultaneously, the payload disassembling section 116 extracts the address and data of the payload and sends them to the micro processor 10 through the I/O control section 110.

Figure 10:
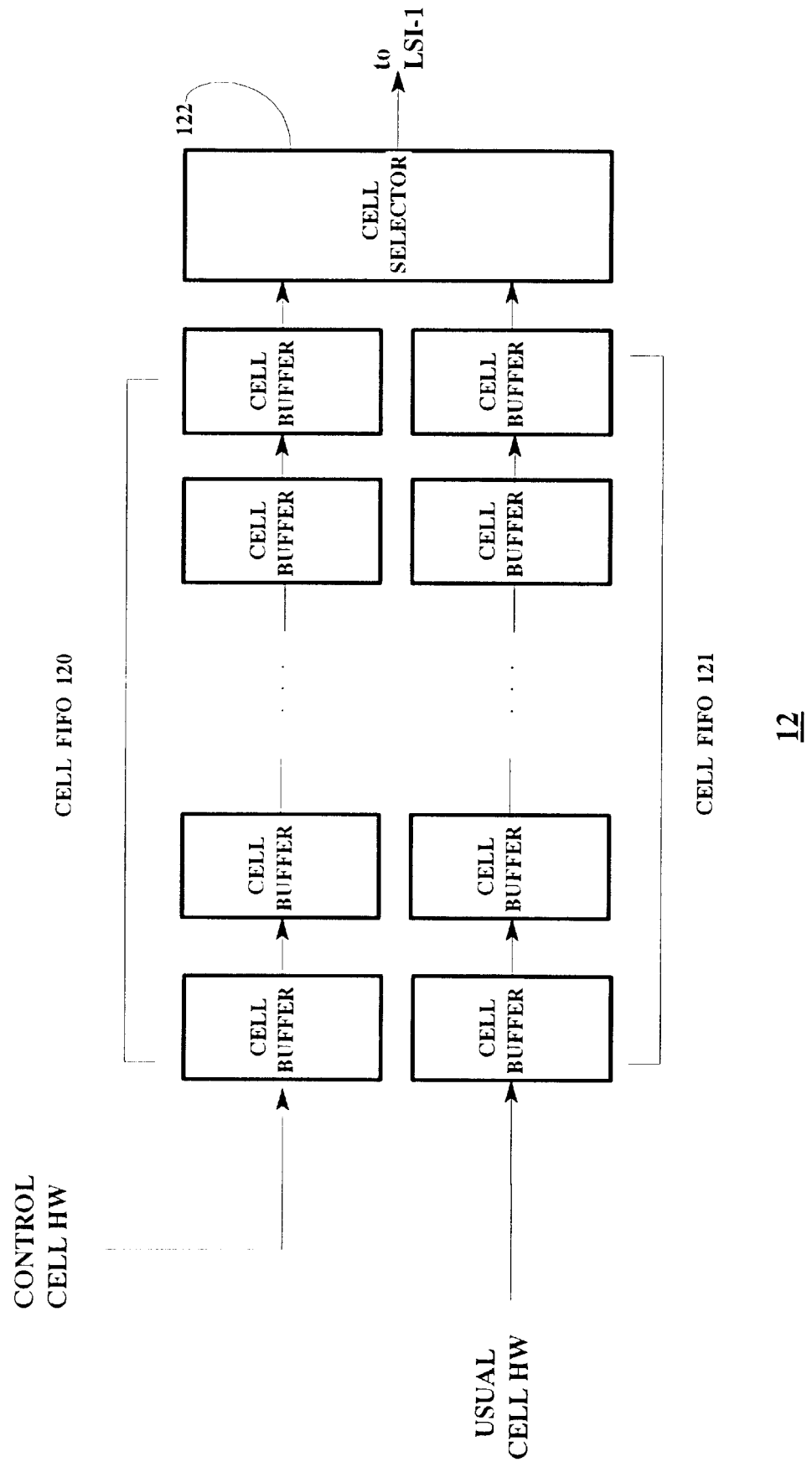
FIG. 10 is a block diagram illustrating a control cell inserting section.

FIG. 10 is a structural example of the control cell inserting section 12. The control cell inserting section 12 is constituted with a FIFO memory and a cell selector 122. The cell FIFO memory includes a cell FIFO 120 for control cells and a cell FIFO 121 for usual cells on the cell HW.

The cell FIFOs 120 and 121 are provided to give a buffer function for inserting control cells to empty areas of the usual cells. The outputs of the cell FIFOs 120 and 121 are selected by the cell selector 122 to send to the LSI-1.

Figure 11:
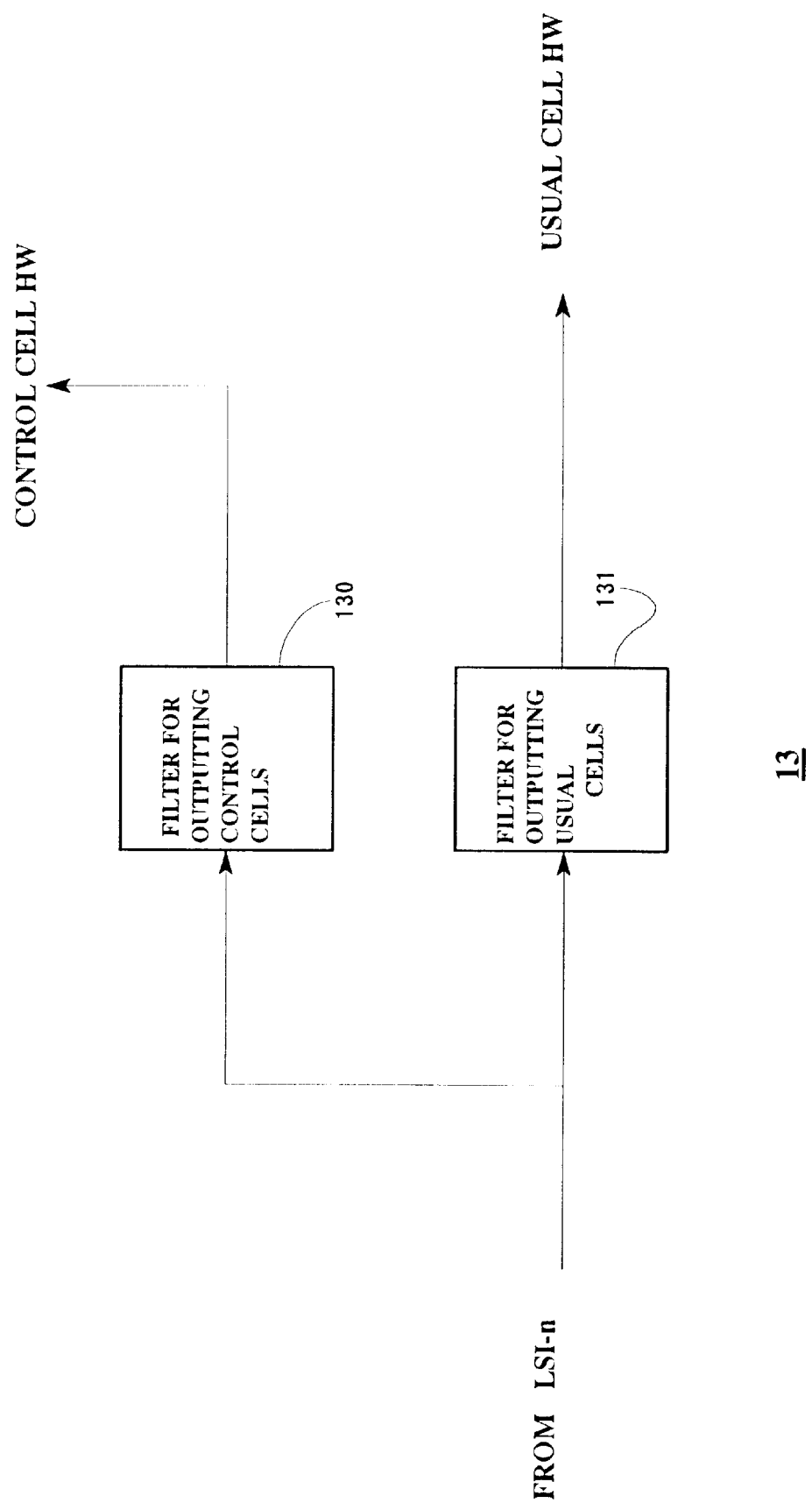
FIG. 11 is a block diagram illustrating a control cell extracting section.
Figure 12:
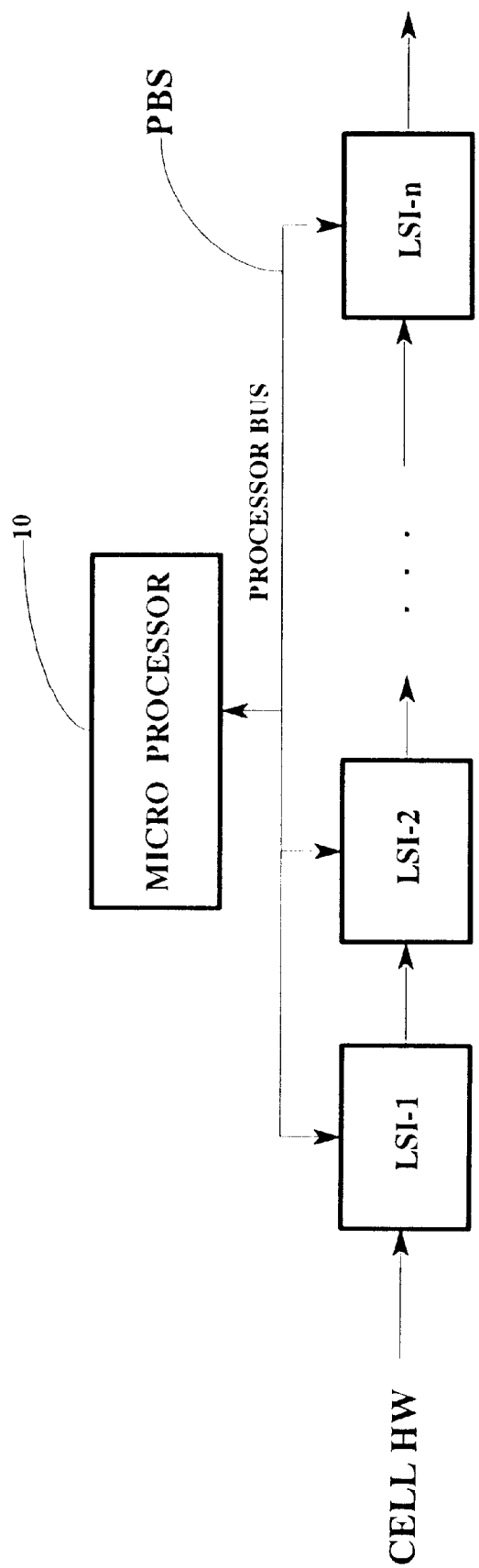
FIG. 12 is a block diagram illustrating a concept of a structure for a device, which performs cell processing.

FIG. 11 is a structural example of the control cell extracting section 13. The control cell extracting section 13 includes a filter, which cuts out usual cells and a filter 131, which cuts out control cells. The output from the LSI-n on the end stage is inputted to the filters 130 and 131.

The filter 130, which cuts out the usual cells, and the filter 131, which cuts out the control cells, distinguish between the control cells and the usual cells according to existence of chip select in the header section of a cell.

The filter 130 cuts out the usual cell having no chip select in the header and outputs only the control cells. The filter 131 cuts out the control cell having a chip select in the header and outputs only the usual cells.

The control cells sent from the filter 130, which cuts out the usual cells, are inputted to the processor bus to control cell HW convertor 11 through the control cell HW 16. Further, the usual cells, that is outputs, of the filter 131, which cuts out the control cells, are sent on the usual cell HW 15.

With the above-described explanation, although the present invention is explained according to the embodiment applied the present invention to the individual section of the ATM switch, the present invention is not limited to this. The present invention may be applied to other portion, of the ATM switch, which is controlled by a micro processor. Namely, it is possible to apply the present invention to the common section, of the ATM switch, which is constituted with a plurality of LSIs.

As explained above according to the embodiments, the present invention realizes to simplify a connection between the micro processor 10 and each of LSIs. Accordingly, it becomes possible to use LSIs having a small number of contact terminals, thereby that the ATM switch may be made compact.

What is claimed is:

1. An asynchronous transfer mode switch comprising:
   a plurality of circuits connected in cascade, each for processing asynchronous transfer mode cells for a predetermined stage;
   a processor for outputting control information including addresses corresponding to a plurality of circuits, and receiving control cells sent from the plurality of circuits;
   a converting circuit operatively connected to the processor for converting the control information output from the processor into cells to send to the plurality of circuits, receiving the control cells sent from the plurality of circuits, and converting the control cells into control information including addresses and data to send to the processor;
   a control cell inserting circuit operatively connected to an input of a first circuit of the plurality of circuits for inserting the control cells sent from the converting circuit to asynchronous transfer mode cells to be input to the first circuit; and
   a control cell extracting circuit operatively connected to an output of a last circuit of the plurality of circuits for extracting the control cells sent through the plurality of circuits.

2. The asynchronous transfer mode switch according to claim 1, wherein the first circuit of the plurality of circuits is positioned at a subscriber line side.

3. In an asynchronous transfer mode switch including an individual circuit, to which subscriber lines are connected, an asynchronous transfer mode switch module and a common circuit provided between the individual circuit and the asynchronous transfer mode switch module, the common circuit comprising:
   a plurality of circuits connected in cascade, each for processing asynchronous transfer mode cells for a predetermined stage;
   processor for outputting control information including addresses corresponding to the plurality of circuits, and receiving control cells sent from the plurality of circuits;
   a converting circuit operatively connected to the processor for making the control information output from the processor into cells to send to addresses ones of the plurality of the circuits, receiving the control cells sent from the plurality of circuits, and converting the control cells into control information including an address and data to send to the processor;
   a control cell inserting circuit operatively connected to an input of a first circuit positioned at the side of the subscriber lines of the plurality of circuits for inserting the control cells sent from the converting circuit to asynchronous transfer mode cells to be input to the first circuit; and
   a control cell extracting circuit operatively connected to an output of a last circuit positioned at the side of the asynchronous transfer mode switch module, of the plurality of circuits for extracting the control cells sent through the plurality of circuits.

4. The asynchronous transfer mode switch according to any of claims 1, 2 or 3, further comprising:
   a usual cell high way through which the asynchronous transfer mode cells pass, a control cell high way through which the control cells pass and a processor bus connecting the micro processor with the converting circuit, through which the control information passes.

5. The asynchronous transfer mode switch according to claim 4,
   wherein the control cell is constituted with a header section including a chip select, and a payload section including an address to specify one of the plurality of circuits connected in series, to which the control cell is directed, and data.

6. The asynchronous transfer mode switch according to claim 4,
   wherein the usual cell high way is an optical transmission fiber.

7. The asynchronous transfer mode switch according to claim 4,
   wherein the usual cell high way includes ascending and descending lines, and the control cell inserting circuit and the control cell extracting circuit are connected to either of the ascending and descending lines.

8. An asynchronous transfer mode switch comprising:
   a usual cell highway having ascending and descending lines, through which asynchronous transfer mode cells pass;
   a plurality of circuits connected in cascade for processing the asynchronous transfer mode cells;
   a processor for outputting control information including addresses corresponding to the plurality of circuits, and receiving control cells sent from the plurality of circuits;
   a converting circuit operatively connected to the processor for making the control information output from the processor into cells to send to addressed ones of the plurality of circuits, receiving the control cells sent from the plurality of circuits, and converting the control cells into control information including an address and data to send to the processor;

a control cell inserting circuit positioned on the side of the descending line for inserting the control cells sent from the converting circuit to asynchronous transfer mode cells to be input; and a control cell extracting circuit positioned on the ascending line for separating the asynchronous transfer mode cells and the control cells sent from the plurality of circuits and extracting the control cells.

9. The asynchronous transfer mode switch according to claim 8, wherein the control cell inserting circuit monitors empty usual cells on the usual cell highway and inserts the control cells sent from the plurality of circuits to empty areas of the usual cells.

10. The asynchronous transfer mode switch according to claim 8, wherein the control cell inserting circuit provides predetermined cell slots respectively for the plurality of circuits to usual cells on the usual cell highway and loads the control cells sent from the plurality of circuits on the corresponding predetermined cell slots.

11. The asynchronous transfer mode switch according to claim 8, wherein the control cell inserting circuit provides a predetermined cell slot to usual cells on the usual cell highway and loads all of the control cells sent from the plurality of circuits on the predetermined cell slot.

12. An asynchronous transfer mode switch comprising:

a plurality of circuits connected in cascade, each circuit processing asynchronous transfer mode cells for a predetermined stage;

a processor outputting control information including an identifier corresponding to at least one circuits;

a converting circuit operatively connected to the processor, making the control information sent from the processor into a control cell to send to the at least one circuits; and a control cell inserting circuit operatively connected to an input of a first circuit of the plurality of circuits, inserting the control cell sent from the converting circuit into asynchronous transfer mode cells to be inputted to the first circuit.

* * * * *